(12) United States Patent
Thomas

(10) Patent No.: US 7,216,530 B2
(45) Date of Patent: May 15, 2007

(54) FLUID CONTAINMENT ELEMENT LEAK DETECTION APPARATUS AND METHOD

(76) Inventor: Matthew E. Thomas, 5565 Crest Dr., Palmdale, CA (US) 93551

( * ) Notice: Subject to any disclaimer, the term of this patent is extended or adjusted under 35 U.S.C. 154(b) by 198 days.

(21) Appl. No.: 10/992,967

(22) Filed: Nov. 19, 2004

(65) Prior Publication Data

US 2006/0107731 A1 May 25, 2006

(51) Int. Cl.
*G01M 3/04* (2006.01)
*G01F 23/00* (2006.01)

(52) U.S. Cl. .......................... 73/49.2; 73/302

(58) Field of Classification Search ............. 73/40.5 R, 73/49.2, 40.7, 302
See application file for complete search history.

(56) References Cited

U.S. PATENT DOCUMENTS

| | | | | | |
|---|---|---|---|---|---|
| 2,353,275 | A | * | 7/1944 | St Clair | 73/37 |
| 3,683,675 | A | * | 8/1972 | Burton et al. | 73/40.7 |
| 3,910,102 | A | * | 10/1975 | McLean | 73/40.5 R |
| 4,114,426 | A | * | 9/1978 | McLean | 73/40.5 R |
| 4,474,054 | A | * | 10/1984 | Ainlay | 73/49.2 |
| 4,561,291 | A | * | 12/1985 | Ainlay | 73/49.2 |
| 4,590,793 | A | * | 5/1986 | Staats, Jr. | 73/40 |
| 4,807,464 | A | * | 2/1989 | Janotta | 73/49.2 |
| 4,862,734 | A | * | 9/1989 | Elderton | 73/49.2 |
| 4,882,929 | A | * | 11/1989 | Brown | 73/49.2 |
| 4,885,931 | A | * | 12/1989 | Horner | 73/49.2 |
| 4,918,968 | A | * | 4/1990 | Hoffman | 73/40 |
| 4,936,705 | A | * | 6/1990 | Schneider | 405/54 |
| 4,945,757 | A | * | 8/1990 | Schuster | 73/49.2 |
| 5,065,616 | A | * | 11/1991 | Schuster | 73/49.2 |
| 5,072,621 | A | | 12/1991 | Hasselmann | |
| 5,081,864 | A | * | 1/1992 | Zaim | 73/49.2 |
| 5,201,212 | A | * | 4/1993 | Williams | 73/40.5 R |
| 5,372,032 | A | | 12/1994 | Filippi | |
| 7,011,102 | B2 | * | 3/2006 | Folkers | 137/15.11 |
| 7,043,965 | B2 | * | 5/2006 | Schneider | 73/49.2 |

* cited by examiner

*Primary Examiner*—Herzon Williams
*Assistant Examiner*—John Fitzgerald
(74) *Attorney, Agent, or Firm*—Dennis W. Beech

(57) ABSTRACT

The invention may be used for detecting fluid leaks in a fluid containment element having a primary element enclosed in a secondary element. A fluid container may have a reservoir with an upstanding test cylinder with a selected fluid volume. A device may be disposed in the test cylinder to determine the level of a test fluid. There may be a closure for a top opening and the closure may have a hole. A nonexpandable conduit may connected at a first end to the hole and at a second end to a pressurized gas supply. The fluid container may have an outlet port therein and a first end of an outlet nonexpandable conduit may be connected to the outlet port. A block valve may be disposed in the outlet nonexpandable conduit. The fluid container may be pressurized by the introduction of a gas from the pressurized gas supply.

15 Claims, 5 Drawing Sheets

FLUID CONTAINMENT ELEMENT LEAK DETECTION APPARATUS AND METHOD

BACKGROUND OF THE INVENTION

This invention relates to apparatus and methods for detecting fluid leaks from fluid containment elements, such as, storage tanks, pipelines, sumps and the like, that may be used for storage and dispensing fluids such as gasoline. The enhanced leak detection apparatus and method may be based on use of a hydrostatic pressure apparatus for measurement of changes in a test cylinder to determine if a leak condition has occurred. The apparatus and method may be used to detect leaks of 0.005 gallons per hour in gasoline underground storage tanks and related pipelines in order to meet current U.S. Government and State of California environmental protection requirements.

Currently apparatus and methods for measuring variations in pipeline flow may exist for use in determining leaks in underground pipeline systems. However, these systems may not allow for continuous monitoring during use at a gasoline distribution site and may not have the necessary accuracy resolution to meet current government standards. There may be methods for continuous monitoring for leaks in underground storage tanks and pipelines for gasoline stations to meet previous government regulations, but with the introduction of enhanced leak detection requirements the existing systems may not be capable or certifiable to perform compliance tests. The currently known tests for continuous monitoring may also require shut down of a gasoline station operation for a period of time to perform the operation.

SUMMARY OF THE INVENTION

The present invention is directed to apparatus and methods for detecting fluid leaks in a fluid containment element having a primary element enclosed in a secondary element. A fluid container may have a reservoir with an upstanding test cylinder with a selected fluid volume and may have a top opening. A device may be disposed in the test cylinder to determine the level of a test fluid disposed in the test cylinder. There may be a closure for the top opening and the closure may have a hole therethrough. A nonexpandable conduit may be connected at a first end to the hole and at a second end to a pressurized gas supply that may be controlled by a constant pressure regulator. The fluid container may have an outlet port therein and a first end of an outlet nonexpandable conduit may be connected to the outlet port. A block valve may be disposed in the outlet nonexpandable conduit. The fluid container may be pressurized by the introduction of a gas from the pressurized gas supply. The outlet nonexpandable conduit may have a second end connected to the secondary element to introduce fluid therein. A vacuum test apparatus may be connected to the primary element for evacuation of the primary element to create a relative vacuum condition interior to the primary element.

These and other features, aspects and advantages of the present invention will become better understood with reference to the following drawings, description and claims.

DETAILED DESCRIPTION

The following detailed description represents the best currently contemplated modes for carrying out the invention. The description is not to be taken in a limiting sense, but is made merely for the purpose of illustrating the general principles of the invention.

Figure 1:
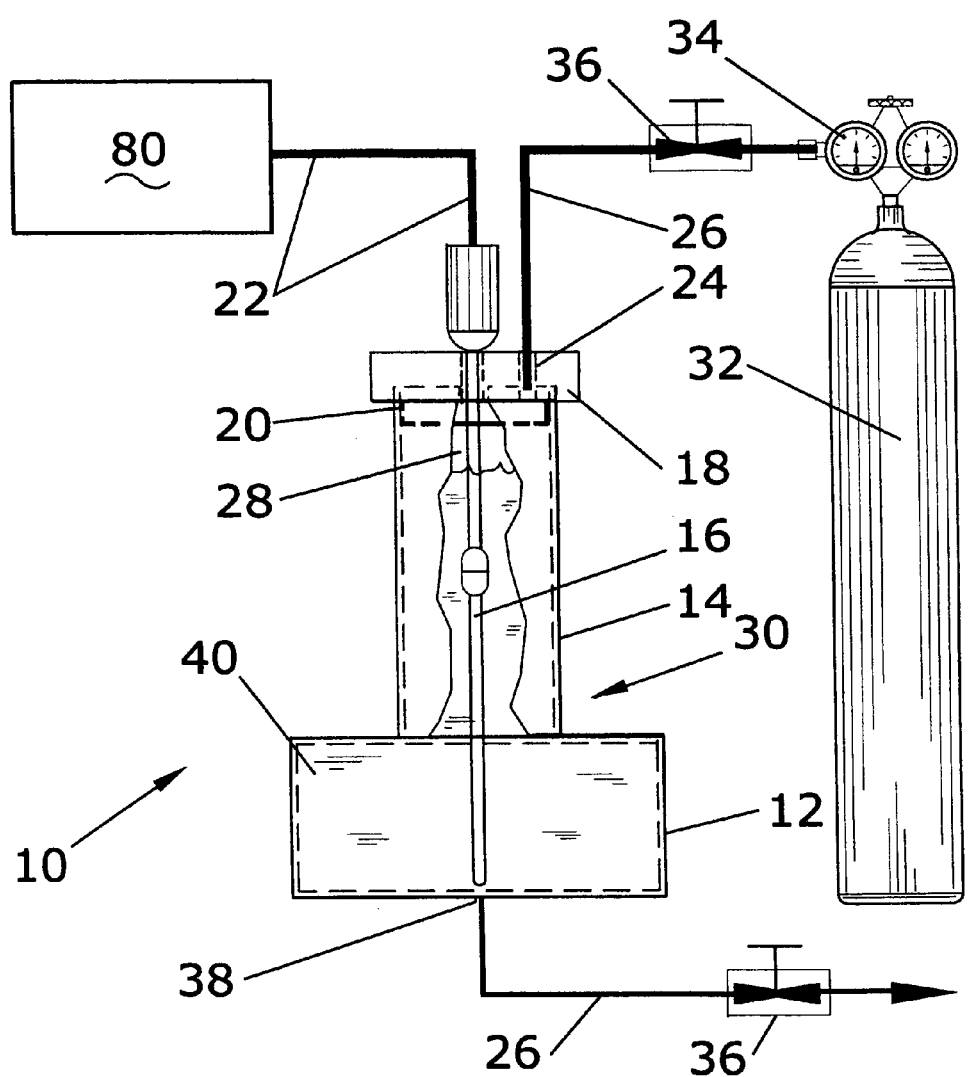
FIG. 1 illustrates a schematic view of the test apparatus according to an embodiment of the invention.
Figure 2:
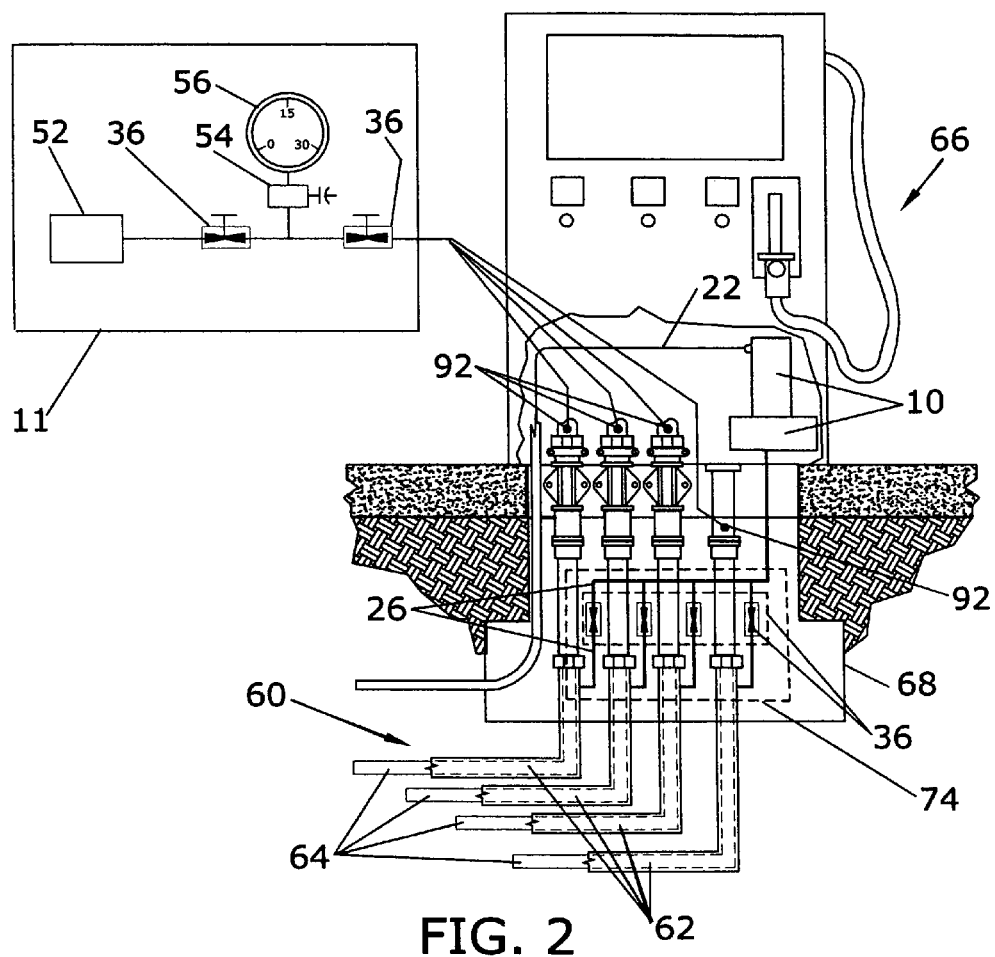
FIG. 2 illustrates a side elevation partial cut away view of a gasoline dispenser system with schematic representation of the test apparatus according to an embodiment of the invention.

Referring to FIGS. 1 and 2, a hydraulic test apparatus 10 may be connected to an element of a fluid storage and dispensing system, such as, an underground storage tank or a pump station as may be used at a gasoline or service station. The test apparatus 10 may be connected to an element, such as, a secondary pipe, a secondary storage tank, sumps, dispenser pans and the like, by nonexpandable conduit or tubing for fluids. A vacuum test apparatus 11 may be connected to an element, such as, a primary pipe, or a product pipe, a vent pipe or a vapor pipe.

The test apparatus 10 may have a fluid container 30 having a reservoir 12 having a volume of 64 fluid ounces and an upstanding test cylinder 14 having a volume of 32 fluid ounces in fluid communication with the reservoir 12. The test cylinder 14 may be 16 inches in length. The test cylinder 14 may have provision for visual observation of the fluid level therein or it may have a fluid level sensor 16 installed, for example, a magnetostrictive probe, to sense the fluid level. A closure 18 may be attached at a top 20 of the test cylinder 14 for attachment and suspension of the fluid level sensor 16 in the test cylinder 14 and for connection of electrical signal cables 22. The closure 18 may also have apertures or ports 24 for fluid connection of nonexpandable conduit 26 to for example introduce a gas 28 such as nitrogen to pressurize the fluid container 30. The conduit 26 may be in fluid communication with a nitrogen gas supply 32 that may have a pressure of 100 psi that may be controlled by a constant pressure regulator 34. There may be a block valve 36 intermediate the gas supply 32 and the port 24.

The fluid container 30 may have an outlet port 38 with nonexpandable conduit 26 connected thereto for fluid communication with a test element 60 that may be a secondary pipe 62. The conduit 26 may have a block valve 36.

Figure 3:
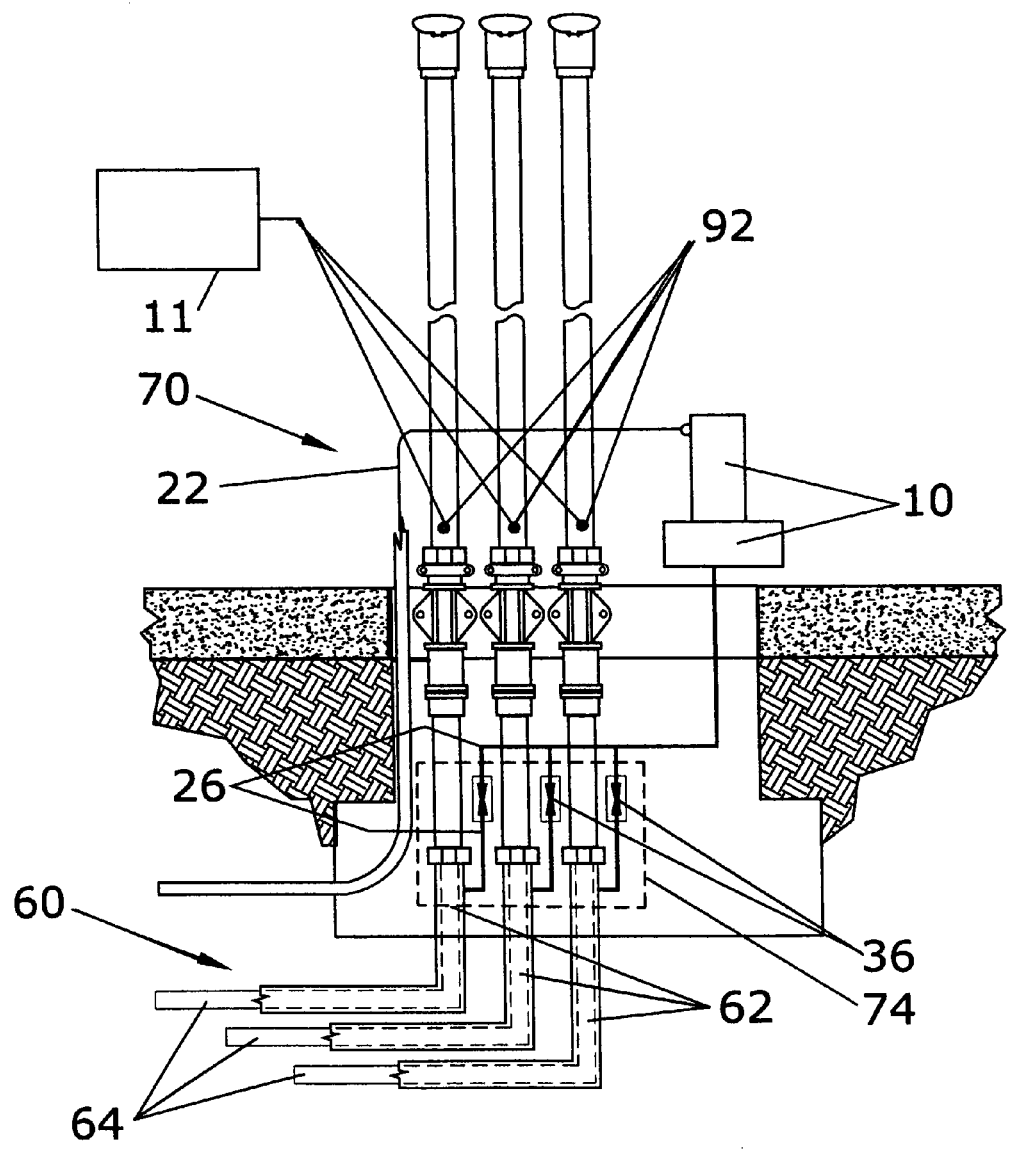
FIG. 3 illustrates a side elevation partial cut away view of a vent station with schematic representation of the test apparatus according to an embodiment of the invention.

Referring to FIGS. 1 through 3, the test apparatus 10 may be disposed in a dispenser portion 68 of a gas pump station 66 or in a vent station 70. The stations 66, 70 may have one or more primary and secondary pipe elements 62, 64 that may be connected between an underground storage tank 72 and the gas pump station 66 or vent station 70. The test apparatus 10 may be connected in fluid communication with one or more secondary pipes 62 having a manifold valve 74 in a wall of the secondary pipe 62. The manifold valve 74 may allow introduction of a test fluid 40, such as, brine, biodegradable oil, water or the like, into a cavity 76 between the secondary pipe 62 and the primary pipe 64. The manifold valve 74 may also allow removal of the test fluid 40 and introduction of a gas such as nitrogen or evacuation of gas in the cavity 76 to create a vacuum.

If the test apparatus 10 includes a fluid level sensor 16, the fluid level sensor 16 may be in electrical communication with a monitor station 80 that may collect data from the fluid level sensor 16 to determine hydrostatic fluid level in the test cylinder 14. Other electronic sensors may also be connected to the monitor station 80 depending on the particular test configuration. With a test fluid 40 in cavity 76 and in fluid container 30 monitoring or testing of the secondary pipe 62 for a leak may be conducted by monitoring the fluid level in the test cylinder 14. Once the test fluid 40 has reached equilibrium, during filling of the cavity 76 provision to minimize air in the form of bubbles or pockets may be necessary, the fluid container 30 may be pressurized to 1.5 times the normal working pressure of the element to be tested and be maintained at the pressure by a constant pressure regulator 34.

In the instance of a secondary pipe 62 the normal working pressure may be 14.7 psia. The fluid container 30 may then be pressurized to 22.05 psia using gas supply 32. The test may allow for the bulk modulus adjustment of the pipe and may require additional test fluid 40 be added to the fluid container 30 to establish an initial condition fluid level in the test cylinder 14.

Once fluid level equilibrium may be achieved, a test period of 6 to 24 hours may be conducted. With use of a fluid level sensor 16 that may have a resolution of 0.001 inch, if a test for a leak rate of 0.005 gph, gallons per hour, is conducted for a period of two hours the fluid leak may be 0.01 gallons or 1.28 fluid ounces. If the test cylinder 14 contains 32 fluid ounces and is shaped to contain 2 fluid ounces per inch of length, the fluid level sensor 16 may measure a 0.005 gph leak in two hours. If no leak condition is detected the secondary pipe 64 may be determined to be secure. If a leak is detected, it may be discovered prior to burial of the pipe by a visual external inspection. If the pipe is buried in the ground or otherwise inaccessible, the leak may be located by use of a florescent detecting device insertable in the primary pipe 64 to detect outflow of fluid.

If a visual observation of test cylinder 14 fluid level may be conducted, a test time of longer duration may be necessary to confirm there are no leaks. The test may take up to approximately 24 hours depending on the accuracy and resolution required.

A test of a primary pipe 64 may be conducted at 1.5 times the normal working pressure of the system that for an underground storage tank 72 system may be approximately 59.7 psia. The primary pipe 64 may be isolated from a storage tank 72 by a block valve 36 and the primary pipe 64 may be evacuated to create a relative vacuum condition. A vacuum test fixture 11 that may be connected to a primary pipe 64 at a shear valve test port 92 by nonexpendable conduit 26 may have a vacuum pump 52 for use in evacuating a primary pipe 64. There may be one or more block valves 36 to control fluid flow related to the vacuum pump 52 and a three way valve 54 for pressure increase or decrease and a vacuum gauge 56 or sensor to monitor pressure in the primary pipe 64. The secondary pipe 62 may be pressurized by use of the test apparatus 10 to 30 psia. Once fluid equilibrium may be achieved, the primary test may proceed as described for the secondary pipe 62. If the primary pipe may be leaking two results may be observed wherein one, the test cylinder 14 may lose fluid and two, the primary pipe 64 may lose vacuum.

If a leak is detected, the pressure in the primary pipe 64 may be raised to 7.0 psia and the test method rerun. This pressure change may exponentially change the leak rate to confirm that the primary pipe 64 may be leaking. Should the leak rate or fluid loss from test cylinder 14 not change with the primary pipe 64 pressure change, then the leak rate may become the basis or baseline for further testing the primary pipe 64. Should a further test at the 7.0 psia pressure level confirm the approximate leak rate and that there is no decrease in vacuum conditions, the primary pipe 64 may be secure.

A further test may then be conducted with 0.0 psia pressure in the primary pipe 64 and 14.7 psia pressure in the secondary pipe 62. The leak rate detected at the test cylinder 14 may be zero if the secondary pipe 62 was leaking.

Figure 4:
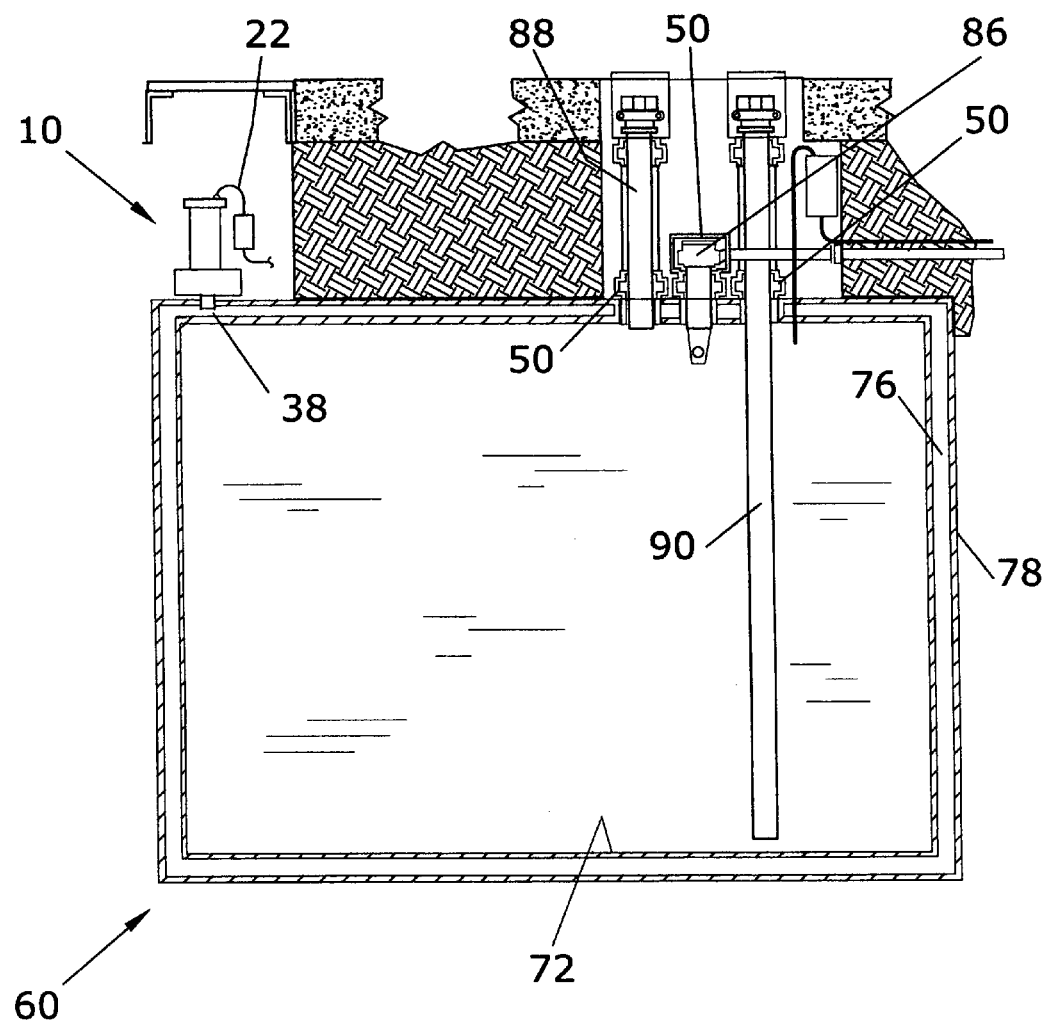
FIG. 4 illustrates a side elevation partial cut away view of a double wall storage tank with schematic representation of the test apparatus according to an embodiment of the invention.
Figure 5:
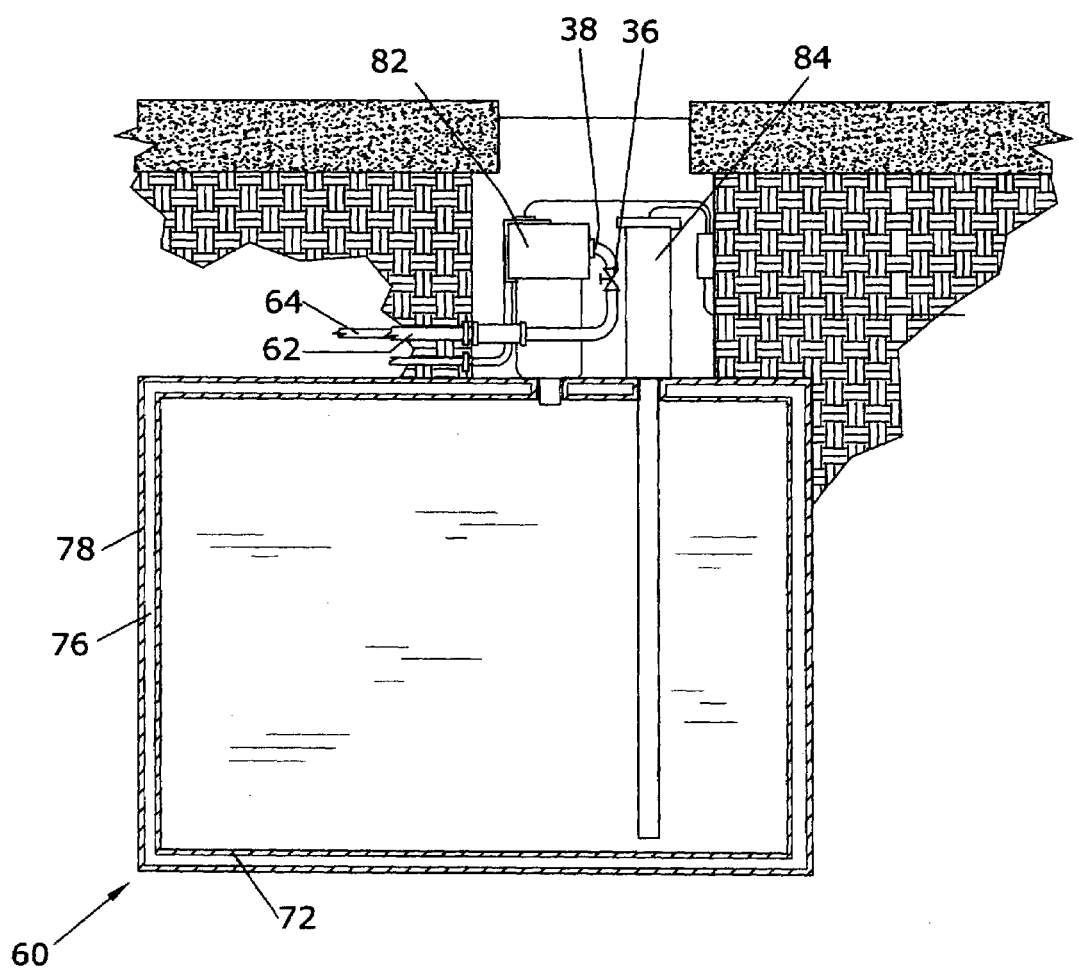
FIG. 5 illustrates a side elevation partial cut away view of a sump associated with an underground storage tank according to an embodiment of the invention.

Referring to FIGS. 4 and 5, tanks 72, fluid pumps 82, tank level monitors 84, extractor valves 86, vapor pipes 88, fill pipes 90 and other elements may be tested for leaks in a similar manner wherein the working pressure for the particular element may be identified and the test apparatus 10 test pressure condition may be adjusted accordingly. For example, if a primary tank has a working pressure of 14.7 psia, the fluid container 30 may be pressurized to approximately 1.5 times the normal working pressure. The test time may take 4 hours for electronic measurement or 24 hours for visual observation. Clam shell covers 50 may be used to enclose elements such as extractor valves 86, vapor pipes 88, fill pipes 90 or other elements that are not double walled in order to test for leakage. The claim shell covers 50 may be temporarily or permanently installed.

The test apparatus may be used to retest the system elements once they have been buried in the ground to check that no leaks have been created as part of the construction. Once the tanks and other elements may be put into service at for example a service station, the secondary pipe 62, secondary storage tanks 78 and the like that have space or a cavity 76 formed between a primary and secondary element that may be filled with test fluid 40 and continuous monitoring for leaks may be conducted by visual or electronic monitoring of fluid levels in test cylinders 14. This may aid in detecting leaks, particularly to the external environment.

While the invention has been particularly shown and described with respect to the illustrated embodiments thereof, it will be understood by those skilled in the art that the foregoing and other changes in form and details may be made therein without departing from the spirit and scope of the invention.

I claim:

1. An apparatus for detecting fluid leaks in a fluid containment element having a primary element enclosed in a secondary element comprising:
   a fluid container having a reservoir with an upstanding test cylinder with a selected fluid volume and having a top opening;
   a fluid level sensor disposed in said test cylinder to determine the level of a test fluid disposed in said test cylinder;
   a closure for said top opening and said closure having an aperture therein;
   a nonexpandable conduit connected at a first end to said aperture and at a second end to a pressurized gas supply controlled by a constant pressure regulator;
   said fluid container having an outlet port therein and a first end of an outlet nonexpandable conduit connected to said outlet port wherein a block valve is disposed in said outlet nonexpandable conduit; and
   said fluid container pressurizable by introduction of gas from said pressurized gas supply.

2. The apparatus as in claim 1 wherein said reservoir has a fluid capacity of 64 fluid ounces and said test cylinder is 16 inches long and has a fluid capacity of 32 fluid ounces.

3. The apparatus as in claim 1 wherein said fluid level sensor is replaced by is a visual fluid level observation device.

4. The apparatus as in claim 1 wherein said fluid level sensor is a magnetostrictive probe attached to said closure oriented in a downwardly direction disposed in said fluid container; and said magnetostrictive probe is in electrical communication with a monitor station.

5. The apparatus as in claim 1 wherein said pressurized gas supply having an inert gas pressurized to approximately 100 psi and said nonexpandable conduit having a block valve intermediate said pressurized gas supply and said closure.

6. The apparatus as in claim 1 further comprising:
said fluid container is filled with a test fluid to a predetermined level;
a second end of said output nonexpandable conduit is connected to a secondary element of a fluid containment element wherein a cavity is formed between said secondary element and a primary element and said cavity having said test fluid disposed therein;
said fluid container is pressurized to a predetermined multiple of the operating pressure of said secondary element;
said test fluid is established to be in a pressure equilibrium condition; and
said predetermined level is observable for a predetermined time to detect any variation in level.

7. The apparatus as in claim 6 wherein said predetermined multiple is 1.5 times.

8. The apparatus as in claim 6 wherein said secondary element having a manifold valve for connection of said output nonexpandable conduit and for connection of a gas pressure source and a vacuum source.

9. A method for monitoring a fluid containment element having a primary element enclosed in a secondary element having a cavity therebetween comprising:
attaching a test apparatus having a fluid container with a reservoir and an upstanding test cylinder having a top opening with a closure therefore to said secondary element of a fluid containment system;
said attaching being an output nonexpandable conduit attached at a first end to an output port of said fluid container and attached at a second end to a wall of said secondary element to be in fluid communication with said cavity;
attaching a pressurized gas supply having a constant pressure regulator to a first end of a gas nonexpandable conduit and attaching a second end of said gas nonexpandable conduit to an aperture in said closure;
filling said cavity and said fluid container with a test fluid to a predetermine level of said test cylinder;
pressurizing said fluid container with an inert gas from said pressurized gas supply;
adjusting said test fluid content in said fluid container to achieve equilibrium at said predetermined level;
observing said predetermined level of said test fluid for a time period based on a leak detection test condition;
determining a change in test fluid level and comparing said change to said leak detection test condition; and
determining if a leak has occurred in one of said secondary element and said primary element.

10. The method as in claim 9 further comprising:
sealing said primary element and evacuating the interior thereof to create a relative vacuum condition after the step of attaching said test apparatus; and
observing said relative vacuum condition of said primary element concerned with the step of observing said predetermined level to determine any change in said primary element vacuum condition.

11. The method as in claim 9 wherein said pressurizing is to 1.5 times the operating pressure of said secondary element.

12. The method as in claim 9 further comprising:
introducing an illuminating florescent material into said test fluid and observing said secondary element to identify a leak source.

13. The method as in claim 12 further comprising:
inserting a florescent detector into said primary element to identify said leak source.

14. The method as in claim 9 wherein said reservoir having a fluid capacity of 64 fluid ounces and said test cylinder is 16 inches long with a fluid capacity of 32 fluid ounces.

15. The method as in claim 14 wherein a fluid level sensor having a resolution of 0.001 inch is disposed in said fluid container to measure said predetermined level and said leak detection test condition is a leak rate of 0.005 gallons per hour.

* * * * *